(12) United States Patent
Luna et al.

(10) Patent No.: US 9,428,017 B2
(45) Date of Patent: Aug. 30, 2016

(54) EXCESS PRESSURE CLAIBRATED GUAGE

(71) Applicant: Continental Automotive Systems, Inc., Auburn Hills, MI (US)

(72) Inventors: Enrique Chavez Luna, Guadalajara (MX); Diego Alejandro Alvarez-Alonso, Guadalajara (MX); Antonio Moya Carrillo, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 118 days.

(21) Appl. No.: 14/132,106

(22) Filed: Dec. 18, 2013

(65) Prior Publication Data

US 2015/0165848 A1    Jun. 18, 2015

(51) Int. Cl.
  *F16K 15/20*   (2006.01)
  *B60C 29/06*   (2006.01)

(52) U.S. Cl.
  CPC ........... *B60C 29/068* (2013.04); *B60C 29/064* (2013.04); *Y10T 137/3631* (2015.04)

(58) Field of Classification Search
  CPC .................. B60S 5/043; Y10T 137/3631
  USPC .................. 137/225, 226, 510, 853, 860
  See application file for complete search history.

(56) References Cited

U.S. PATENT DOCUMENTS

| | | | | |
|---|---|---|---|---|
| 1,137,034 | A * | 4/1915 | Tibbetts | 137/225 |
| 3,450,147 | A | 6/1969 | Webb | |
| 3,491,786 | A * | 1/1970 | Bermingham et al. | 137/102 |
| 4,689,306 | A | 8/1987 | Redikultsev et al. | |
| 4,944,323 | A * | 7/1990 | Bartholomew et al. | 137/227 |
| 4,991,618 | A * | 2/1991 | Gould | 137/225 |
| 5,957,151 | A * | 9/1999 | Dalcourt et al. | 137/225 |
| 7,032,611 | B1 * | 4/2006 | Sheng | 137/225 |
| 8,256,467 | B1 * | 9/2012 | Larson et al. | 138/93 |
| 8,377,079 | B2 * | 2/2013 | Coe et al. | 606/151 |

FOREIGN PATENT DOCUMENTS

| | | |
|---|---|---|
| DE | 102012006569 A1 | 3/2012 |
| WO | 0116513 A1 | 3/2001 |
| WO | 0150048 A1 | 7/2001 |

* cited by examiner

*Primary Examiner* — R. K. Arundale

(57) ABSTRACT

A valve assembly having a housing, and a valve portion disposed in the housing, where the valve is able to change between an open position and a closed position. The valve assembly also includes a variable pneumatic device disposed in the housing, which is able to change between a first configuration and a second configuration, and an inner cavity in fluid communication with the housing. An exhaust aperture is formed as part of the housing, and as pressure builds in the variable pneumatic device, the variable pneumatic device changes from the first configuration to the second configuration such that air is prevented from flowing around the variable pneumatic device, and air flowing through the valve body passes through the exhaust aperture.

18 Claims, 3 Drawing Sheets

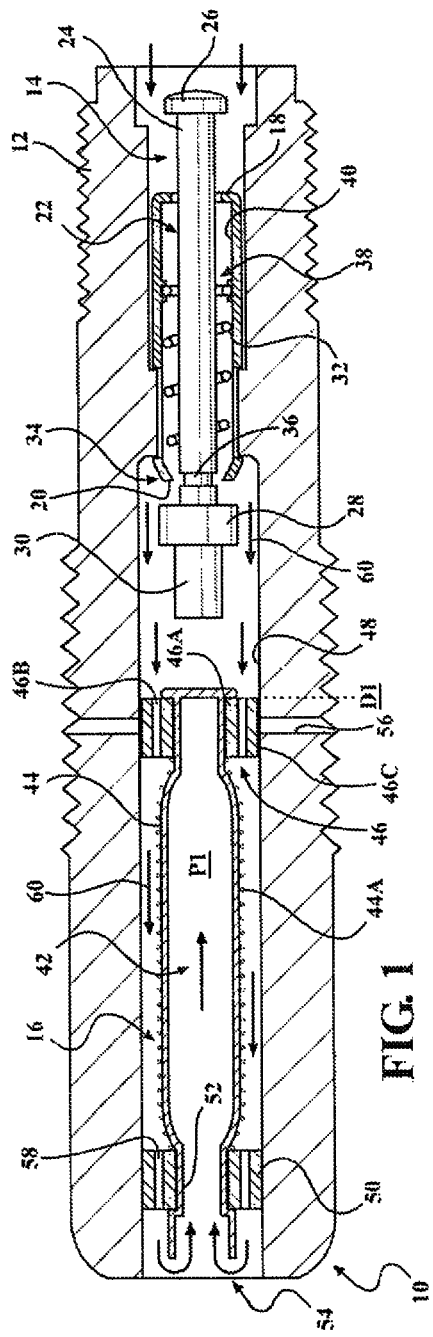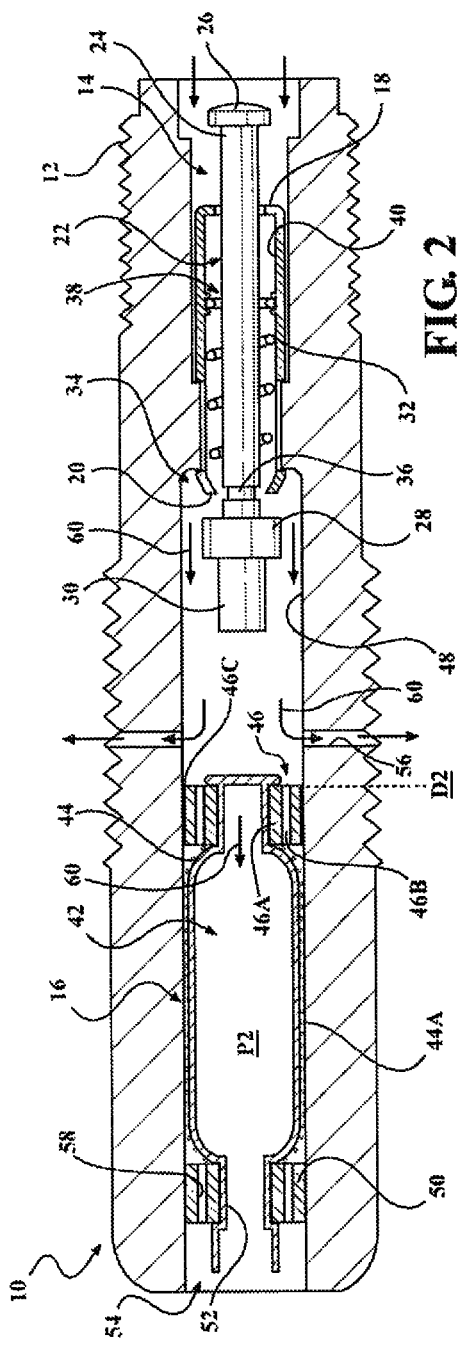

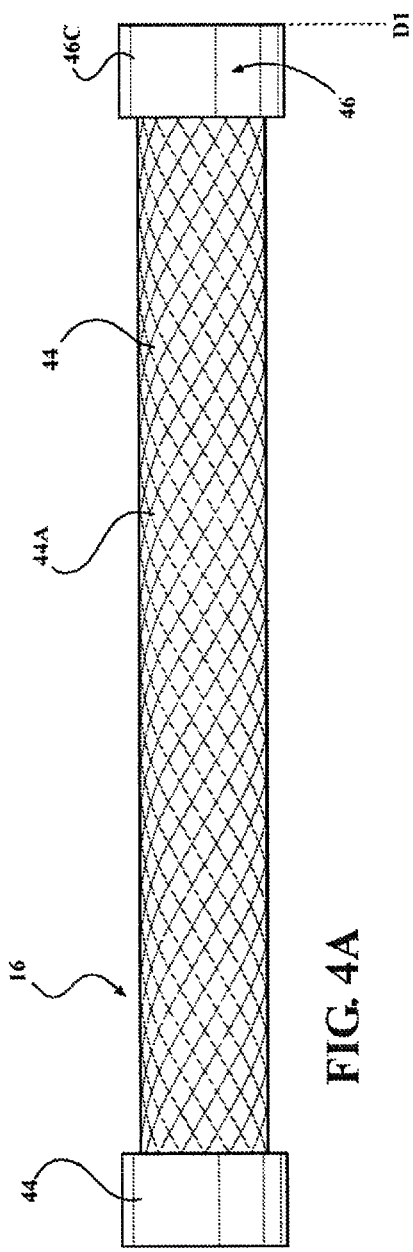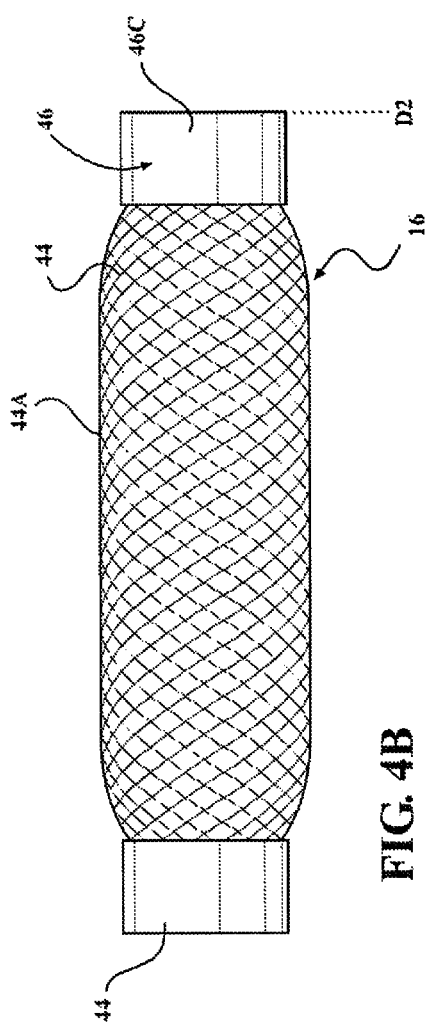
FIG. 4A
FIG. 4B

EXCESS PRESSURE CLAIBRATED GUAGE

FIELD OF THE INVENTION

The invention relates generally to a valve assembly used to prevent over inflation of a tire.

BACKGROUND OF THE INVENTION

Valves are commonly used to facilitate the inflation of a tire. Typically, the pressure in the tire is set to a desired amount to optimize ride feel, tread use, and fuel economy. Since tire pressure varies with temperature, it is important that the tire is inflated properly, such that the tire performs as desired during operation of the vehicle.

There are several dangers that may result from the over inflation of a tire, such a catastrophic failure (i.e., tire blow out), uneven tread wear, as well as a reduction in performance, such as reduced fuel economy.

Accordingly, there exists a need for a valve assembly which prevents the over inflation of a tire, while allowing the desired amount of air to enter the tire to optimize performance.

SUMMARY OF THE INVENTION

The present invention is a valve assembly for preventing the over inflation of a tire, and is used to inflate the tire to a desired pressure. In one embodiment, the valve assembly includes a housing, and a valve disposed in the housing, where the valve is able to change between an open position and a closed position. The valve assembly also includes a variable pneumatic device disposed in the housing, which is able to change between a first configuration and a second configuration, and an inner cavity in fluid communication with the housing. When the valve is in the open position, pressure builds in the variable pneumatic device to change the variable pneumatic device from the first configuration to the second configuration, such that air is prevented from flowing around the variable pneumatic device.

The valve includes a valve body located in the housing, a valve seat formed as part of the valve body, a valve stem at least partially extending through the valve body, and a valve member connected to the valve stem. The valve member is selectively in contact with the valve seat, and a spring is at least partially disposed in the valve body. A first end of the spring is connected to the valve stem, and a second end of the spring is connected to the valve body such that the spring biases the valve member to contact the valve seat, and place the valve in the closed position. The valve member moves from the closed position, where the valve member is in contact with the valve seat, when force is applied to the valve stem to move the valve stem through the valve body and move the valve member away from the valve seat, placing the valve member in the open position.

The variable pneumatic device includes a pneumatic muscle located in the housing, a variable volume cavity disposed within the pneumatic muscle, a dynamic seal connected to a first end of the pneumatic muscle, a static seal connected to a second end of the pneumatic muscle, and an aperture formed as part of the static seal. A portion of the pneumatic muscle extends through the pneumatic seal and into the inner cavity, and as air fills the variable volume cavity and the variable pneumatic device changes from the first configuration to the second configuration, the variable volume cavity expands such that the outer surface of the pneumatic muscle contacts the inner surface of the housing, and the dynamic seal moves towards the static seal.

The dynamic seal prevents air from flowing through an exhaust aperture when the variable pneumatic device is in the first configuration, and air passes out of the exhaust aperture when the variable pneumatic device is in the second configuration. The pressure in the inner cavity is substantially similar to the pressure of the variable pneumatic device when the variable pneumatic device is in the second configuration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a sectional side view of an excessive calibration valve assembly having a variable pneumatic device in a first configuration, according to embodiments of the present invention;

FIG. 2 is a sectional side view of an excessive calibration valve assembly having a variable pneumatic device in a second configuration, according to embodiments of the present invention;

FIG. 4A is a side view of a pneumatic muscle used as part of a calibration valve assembly, where the pneumatic muscle is in a first configuration, according to embodiments of the present invention;

FIG. 4B is a side view of a pneumatic muscle used as part of a calibration valve assembly, where the pneumatic muscle is in a second configuration, according to embodiments of the present invention.

DETAILED DESCRIPTION OF THE PREFERRED EMBODIMENTS

Figure 3:
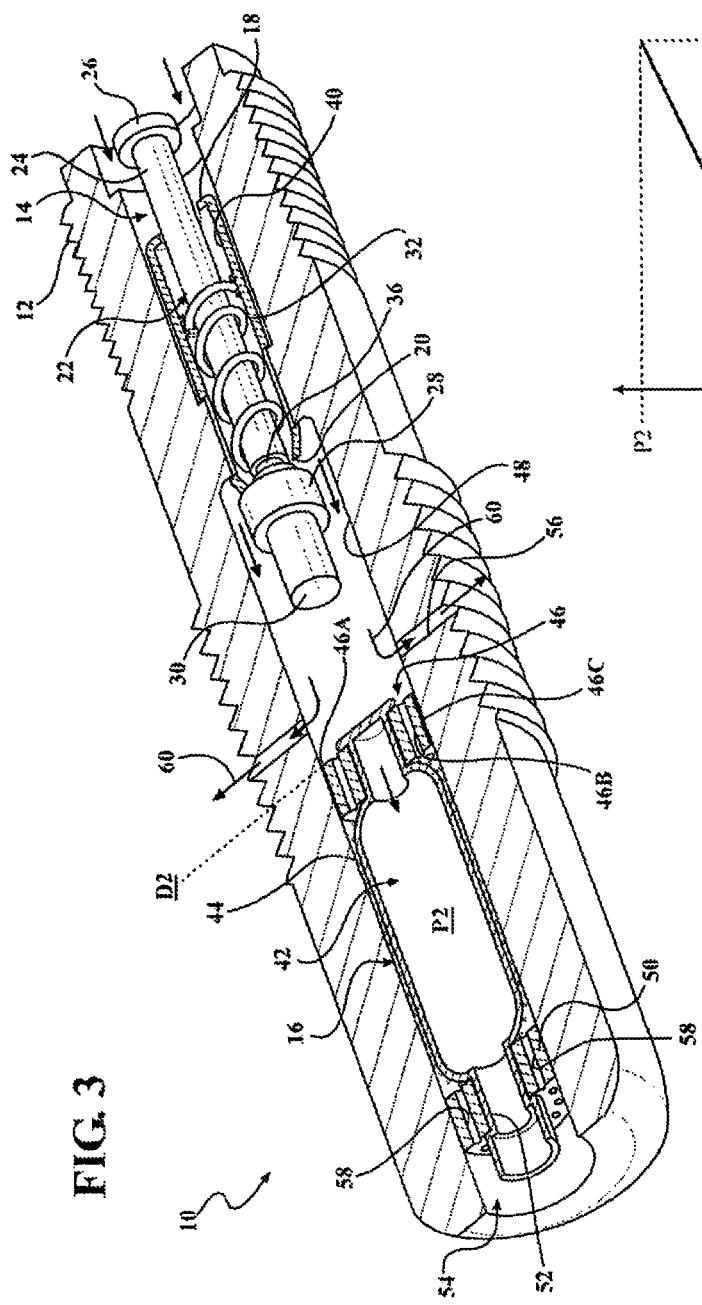
FIG. 3 is another sectional side view of an excessive calibration valve assembly having a variable pneumatic device in a second configuration, according to embodiments of the present invention.

The following description of the preferred embodiment(s) is merely exemplary in nature and is in no way intended to limit the invention, its application, or uses.

An excessive calibration valve assembly is shown in the Figures, generally at 10. The valve assembly 10 is part of a housing 12, and in this embodiment, the housing 12 is a valve stem, but it is within the scope of the invention that the housing 12 may be used in other applications as well.

Disposed within the housing 12 is a valve portion, shown generally at 14, and a variable pneumatic device, shown generally at 16. The valve portion 14 includes a valve body 18 having a valve seat 20. Extending through the valve body 18 is a valve, shown generally at 22, and the valve 22 includes a valve stem 24 having a valve head 26. Connected to the valve stem 24 is a valve member 28 having a protrusion 30, the valve member 28 selectively contacts the valve seat 20 as the valve 22 changes between an open position and a closed position. Partially disposed in the valve body 18 is a spring 32, and a first end, shown generally at 34, of the spring 32 is located in a groove 36 of the valve stem 24, and a second end, shown generally at 38, is connected to an inside surface 40 of the valve body 18. The spring 32 biases the valve member 28 toward the seat 20, and therefore biases the valve 22 to the closed position. The valve 22 moves to the open position when enough force is applied to the valve head 26 to overcome the force of the spring 32, moving the valve member 28 away from the valve seat 20. The distance the valve member 28 moves away from the valve seat 20 depends on the amount of force applied to the valve head 26.

The variable pneumatic device 16 includes a variable volume cavity, shown generally at 42 enclosed by a pneumatic muscle 44. Connected to the pneumatic muscle 44 is a sealing device, which in this embodiment is a dynamic seal, shown generally at 46, which is disposed in the housing 12, and moves along an inner surface 48 of the housing 12. More specifically, the dynamic seal 46 includes a washer 46A having a plurality of flow apertures 46B, through which air passes through under certain conditions. The dynamic seal 46 also includes a seal 46C which is in contact with the inner surface 48 of the housing 12. Also attached to the pneumatic muscle 44 is a static seal 50, which is mounted to the inner surface 48 of the housing 12. The static seal 50 also includes flow apertures 58, through which air passes under certain conditions. A portion of the muscle 44 extends through the static seal 50 forming an aperture 52 exposed to the inner cavity, shown generally at 54, of a tire. Also formed as part of the housing 12 is an exhaust aperture 56, which is selectively blocked by the seal 46C of the dynamic seal 46 as the dynamic seal 46 moves in the housing 12.

In operation, when the tire is deflated, and needs air, the valve assembly 10 is in the position shown in FIG. 1. The muscle 44 is in the first configuration having a first pressure level, P1, and the dynamic seal 46 is in a position D1 such that air is prevented from exiting the exhaust aperture 56 (the seal 46C of the dynamic seal 46 blocks the exhaust aperture 56). A connector from an air dispending device, such as an air compressor or the like, is connected to the housing 12 such that force is applied to the valve head 26, overcoming the force of the spring 32, moving the valve member 28 away from the valve seat 20, placing the valve 22 in the open position. This allows the air to pass through the flow apertures 46B of the dynamic seal 46, and in the area between the inner surface 48 of the housing 12 and the outer surface 44A of the muscle 44, The flow of air in the Figures is indicated by the arrows 60, The air then flows through the flow apertures 58 of the static seal 50 and into the cavity 54. As the cavity 54 fills with air, pressure begins to build in the tire. As the pressure builds in the tire, the muscle 44 also fills with air, and expands until the muscle 44 is in the second configuration shown in FIG. 2. As the muscle 44 fills with air, the muscle 44 expands, and the dynamic seal 46 moves away from the valve portion 14 and moves towards the static seal 50. As the muscle 44 continues to fill with air, a portion of the outer surface 44A of the muscle 44 contacts the inner surface 48 of the housing 12, and the dynamic seal 46 moves toward the static seal 50 such that the dynamic seal 46, and therefore the seal 46C, is no longer blocking the exhaust aperture 56, and air is allowed to exit the exhaust aperture 56. As pressure builds inside the cavity 42, pressure is applied by the outer surface 44A of the muscle 44 to the inner surface 48 of the housing 12.

Figure 5:
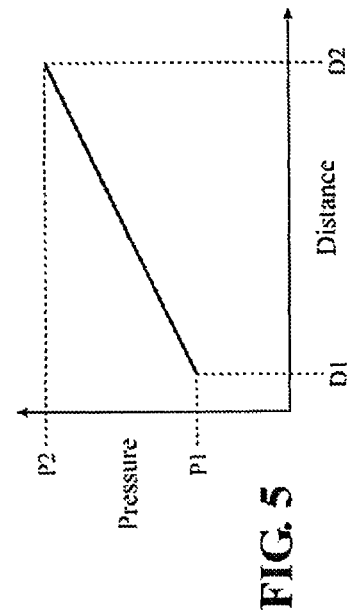
FIG. 5 is a diagram showing the corresponding pressure and change in position of a calibration valve assembly, according to embodiments of the present invention.

Once the pressure inside the cavity 42 is at a second pressure level P2, the portion of the outer surface 44A of the muscle 44 contacts the inner surface 48 of the housing 12 with enough force to prevent air from passing around the muscle 44. The elasticity of the muscle 44 is calibrated such that the muscle 44 expands to the second configuration having the second pressure level P2 shown in FIG. 2 to correspond to the desired pressure in the inner cavity 54. When the muscle 44 is in the second configuration, shown in FIG. 2, the dynamic seal 46 is in a second position D2, and the seal 46C therefore no longer blocks the exit aperture 56, allowing any excess air to escape the exit aperture 56. The relationship between the first pressure level P1, the first position D1, the second pressure level P2, and the second position D2 is shown in FIG. 5.

After the desired amount of air is in the inner cavity 54, the connector or nozzle from the air dispensing device is detached from the housing 12, such that force is no longer applied to the valve head 26, and the spring 32 moves the valve member 28 toward the valve seat 20, such that once the valve member 28 contacts the valve seat 20, the valve is in the closed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a valve assembly, including:
      a housing;
      a valve portion disposed in the housing, the valve portion having an open position and a closed position;
      a variable pneumatic device located in the housing;
      a pneumatic muscle located in the housing; and
      a variable volume cavity disposed within the pneumatic muscle;
      wherein air is allowed to pass through the valve portion when the valve portion is in the open position, and at least partially flows into the variable pneumatic device to change the variable pneumatic device between a first configuration and a second configuration, and air passes around an outer surface of the pneumatic muscle when the variable pneumatic device is in the first configuration such that the variable volume cavity expands and the outer surface of the pneumatic muscle contacts the inner surface of the housing, and air is prevented from passing around the outer surface of the pneumatic muscle when the variable pneumatic device is in the second configuration.

2. The apparatus of claim 1, the valve portion further comprising:
   a valve member; and
   a valve seat, the valve member selectively in contact with the valve seat;
   wherein the variable pneumatic device changes from the first configuration to the second configuration when the valve member is moved away from the valve seat, and the valve portion is moved to the open position.

3. The apparatus of claim 2, the valve portion further comprising;
   a valve body located in the housing;
   a valve stem extending through the valve body, the valve member connected to the valve stem; and
   a spring having a first end and a second end, the first end of the spring connected to the valve stem, and the second end of the spring connected to the valve body, such that the spring biases the valve member toward the valve seat;

wherein the valve portion changes from the closed position to the open position when enough force is applied to the stem to overcome the force applied to the valve member by the spring, and move the valve member away from the valve seat.

4. The apparatus of claim 1, the variable pneumatic device further comprising:
   a dynamic seal connected to a first end of the pneumatic muscle; and
   a static seal connected to a second end of the pneumatic muscle;
   wherein as air fills the variable volume cavity, the dynamic seal moves towards the static seal as the variable pneumatic device changes from the first configuration to the second configuration.

5. The apparatus of claim 4, the variable pneumatic device further comprising an aperture formed as part of the static seal, a portion of the pneumatic muscle extending through the aperture formed as part of the static seal, wherein a portion of the pressurized air passing around the outer surface of the pneumatic muscle flows through the portion of the pneumatic muscle extending through the aperture, and into the pneumatic muscle.

6. The apparatus of claim 5, further comprising an inner cavity, a portion of the pneumatic muscle extending through the aperture and into the inner cavity, such that at portion of the air passing around the outer surface of the pneumatic muscle flows into the inner cavity.

7. The apparatus of claim 4, further comprising an exhaust aperture formed as part of the housing, wherein the exhaust aperture is blocked by the dynamic seal when the variable pneumatic device is in the first configuration, and air flows out of the exhaust aperture when the variable pneumatic device is in the second configuration.

8. The valve assembly of claim 1, wherein the pressure in the inner cavity is substantially similar to the pressure of the variable pneumatic device when the variable pneumatic device is in the second configuration.

9. A valve assembly, comprising:
   a housing;
   a valve portion disposed in the housing, the valve portion being able to change between an open position and a closed position;
   a variable pneumatic device disposed in the housing, the variable pneumatic device able to change between a first configuration and a second configuration;
   an inner cavity, the housing in fluid communication with the inner cavity; and
   an exhaust aperture formed as part of the housing;
   wherein as pressure builds in the variable pneumatic device, the variable pneumatic device changes from the first configuration to the second configuration, such that air is prevented from flowing around an outer surface of the variable pneumatic device, and air flowing through the valve body passes through the exhaust aperture.

10. The valve assembly of claim 9, the valve portion further comprising:
    a valve body located in the housing;
    a valve seat formed as part of the valve body;
    a valve stem at least partially extending through the valve body;
    a valve member connected to the valve stem, the valve member selectively in contact with the valve seat; and
    a spring at least partially disposed in the valve body, a first end of the spring connected to the valve stem, and a second end of the spring connected to the valve body such that the spring biases the valve member to contact the valve seat, and place the valve in the closed position;
    wherein valve member is in the closed position when the valve member is in contact with the valve seat, and when force is applied to the valve stem to overcome the force of the spring and move the valve stem through the valve body, the valve member moves away from the valve seat, changing the valve member to the open position.

11. The valve assembly of claim 9, the variable pneumatic device further comprising:
    a pneumatic muscle located in the housing;
    a variable volume cavity disposed within the pneumatic muscle;
    a dynamic seal connected to a first end of the pneumatic muscle;
    a static seal connected to a second end of the pneumatic muscle; and
    an aperture formed as part of the static seal, a portion of the pneumatic muscle extending through the static seal and into the inner cavity;
    wherein as air fills the variable volume cavity, the variable volume cavity expands such that the outer surface of the pneumatic muscle contacts the inner surface of the housing, and the dynamic seal moves towards the static seal, as the variable pneumatic device changes from the first configuration to the second configuration.

12. The valve assembly of claim 11, wherein the dynamic seal prevents air from flowing through the exit aperture when the variable pneumatic device is in the first configuration, and air passes out of the exit aperture when the variable pneumatic device is in the second configuration.

13. The valve assembly of claim 11, wherein the pressure in the inner cavity is substantially similar to the pressure of the variable pneumatic device when the variable pneumatic device is in the second configuration.

14. A valve assembly for preventing the over inflation of a tire, comprising:
    a housing;
    a valve body disposed in the housing;
    a valve seat formed as part of the valve body;
    a valve member selectively in contact with the valve seat such that the valve member is in contact with the valve seat when the valve member is in a closed position, and the valve member moves away from the valve seat when the valve member is moved to an open position;
    a pneumatic muscle having a variable volume cavity such that the pneumatic muscle is able to change between a first configuration and a second configuration, the pneumatic muscle disposed in the housing in proximity to the valve body;
    an inner cavity, the housing in fluid communication with the inner cavity; and
    an exhaust aperture formed as part of the housing;
    wherein air flows through the valve body and around an outer surface of the pneumatic muscle when the valve member is in the open position and the pneumatic muscle is in the first configuration, and as pressure builds in the inner cavity, the pneumatic muscle expands, such that when the pneumatic muscle is in the second configuration, a portion of the pneumatic muscle contacts the valve body and prevents air from flowing around the outer surface of the pneumatic muscle, and air flowing through the valve body passes through the exit aperture.

15. The valve assembly for preventing the over inflation of a tire of claim 14, further comprising:
   a dynamic seal connected to a first end of the pneumatic muscle, the dynamic seal located in the housing;
   a static seal connected to a second end of the pneumatic muscle, the static seal located in the housing; and
   an aperture formed as part of the static seal;
   wherein a portion of the pneumatic muscle extends through the aperture of the static seal into the inner cavity, such that the air pressure in the inner cavity is substantially similar to the air pressure in the pneumatic muscle.

16. The valve assembly for preventing the over inflation of a tire of claim 15, wherein the dynamic seal blocks the exhaust aperture when the pneumatic muscle is in the first configuration, preventing air from flowing out of the exhaust aperture, and as the pneumatic muscle moves from the first configuration to the second configuration, the dynamic seal moves closer to the static seal.

17. The valve assembly for preventing the over inflation of a tire of claim 14, further comprising:
   a valve stem slidably disposed in the valve body and connected to the valve member; and
   a spring having a first end connected to the valve stem, and a second end connected to an inner surface of the valve body;
   wherein valve member is in the closed position when the valve member is in contact with the valve seat, and when force is applied to the valve stem to overcome the force of the spring, the valve stem moves through the valve body the valve member moves away from the valve seat, placing the valve member in the open position.

18. The valve assembly for preventing the over inflation of a tire of claim 14, further comprising pressure in the inner cavity is substantially similar to the pressure of the variable pneumatic device when the variable pneumatic device is in the second configuration.

* * * * *